March 22, 1960   N. B. CHRISTENSEN   2,929,619
CONTROL DEVICE FOR VEHICLE SUSPENSION
Filed Feb. 13, 1956   2 Sheets-Sheet 1
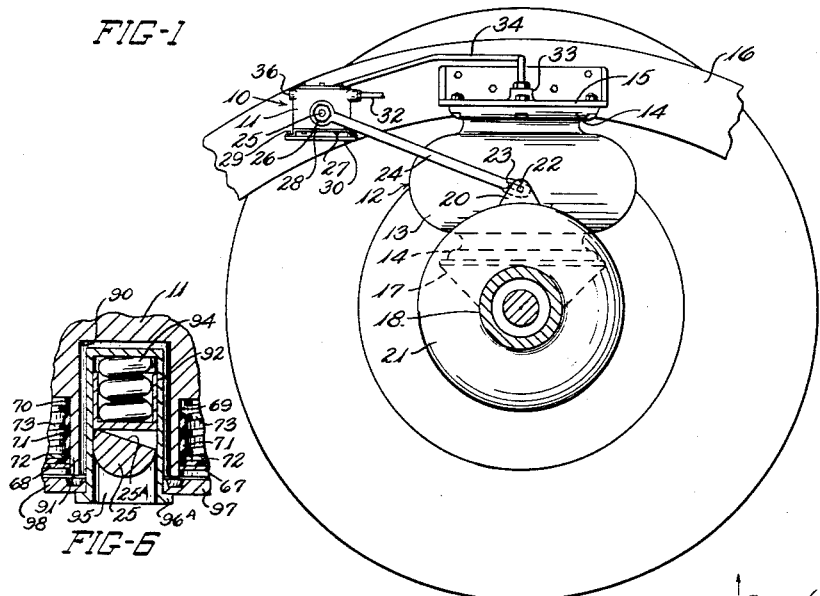
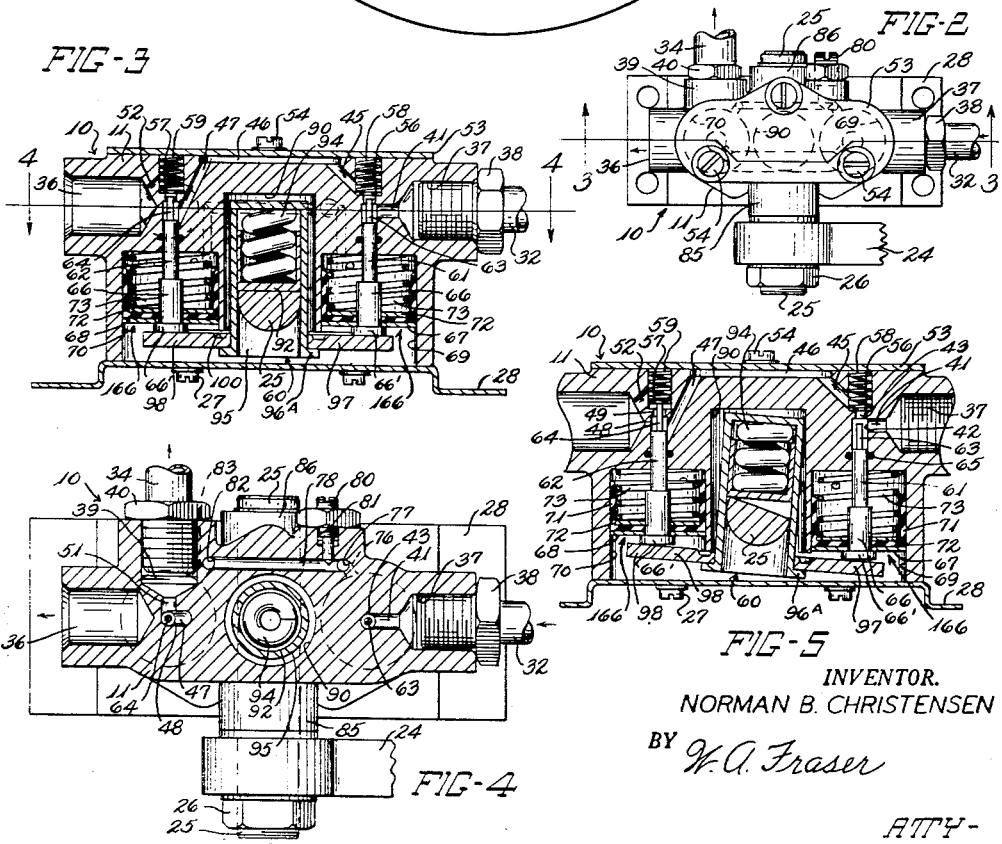
INVENTOR.
NORMAN B. CHRISTENSEN
BY W. A. Fraser
ATTY- March 22, 1960   N. B. CHRISTENSEN   2,929,619
CONTROL DEVICE FOR VEHICLE SUSPENSION
Filed Feb. 13, 1956   2 Sheets-Sheet 2

INVENTOR.
NORMAN B. CHRISTENSEN
BY *W. A. Fraser*

ATTY-

United States Patent Office 2,929,619
Patented Mar. 22, 1960

2,929,619

CONTROL DEVICE FOR VEHICLE SUSPENSION

Norman B. Christensen, North Olmsted, Ohio

Application February 13, 1956, Serial No. 565,108

5 Claims. (Cl. 267—65)

This invention relates generally to suspension systems for vehicles. More particularly, the invention relates to pneumatic suspension systems and provides means whereby pneumatic devices, such as bellows type air springs, may be made to respond to increased or decreased vehicle loads causing a substantial change in the riding level of the vehicle, and yet prevent unnecessary alteration of the riding level when the vehicle road gear passes over a bump or drops into a hole, which actions only momentarily alter the load on the suspension system.

Pneumatic suspension systems, incorporating air springs interposed between the vehicle frame and road or running gear, have been slow to achieve commercial success because they have not been provided with satisfactory valve means for controlling and regulating the air cushion within the air springs. Maintaining a constant average air spring length or air cushion under variable static load conditions, will provide a constant riding level for the vehicle.

A satisfactory valve means for effectively controlling the riding level of a vehicle having an air spring suspension, must be responsive to changing static load conditions. An increase in the load will compress the air spring. To restore the air spring to its initial position, air under increased pressure must be admitted into the air spring. A decrease in load will cause the air spring to extend or raise, and therefore, air must be exhausted or vented from within the air spring to restore it to its initial position.

In addition to controlling the supply and exhaust of air to and from an air spring, a satisfactory valve control means must embody therein an adjustable time delay so that momentary alteration of the static load on the suspension system, such as would be encountered during normal axle movement due to road irregularities, will not cause the valve to supply or exhaust air. This time delay feature is often referred to as "damping" and preferably is adjustable over a time range of from 1 to 20 seconds, as determined by the weight of the vehicle, road conditions, etc.

The operation of the valve means also must not be influenced by the natural frequency of the vehicle suspension system which will probably be in the range of from 1 to 2 cycles per second.

Lastly, a satisfactory valve and its control means must be unaffected by and remain operative under extremes of temperature, humidity and exposure to sand, dirt, grease, oil and water.

It is therefore an object of this invention to provide an improved pneumatic suspension system for vehicles, which system includes improved valve and valve control means for controlling and regulating air springs interposed between the vehicle frame and road gear, so as to furnish a constant riding level for the vehicles and a constant average air spring length.

Another object is to provide an improved valve and control means for control and regulation of a vehicle air spring suspension, which controls the supply and exhaust of air to the air springs, has a novel time delay or "damping" feature, and is operative under extremes of temperature, humidity and other environmental conditions.

A further object is to provide an improved valve and control means located remotely of the air springs and embodying therein a novel adjustable time delay or damping component to prevent excessive operation of the valve, which is accurately responsive to persistent changes in vehicle loading, and which is of simple, relatively uncomplex construction.

A further object is to provide a novel time delay or damping mechanism for use with an air spring control valve.

These and other objects will be apparent in view of the following detailed description of the invention considered with the attached drawings.

In the drawings:

Fig. 1 is a vertical sectional view through a vehicle axle showing in elevation a portion of the vehicle equipped with a pneumatic suspension system according to the invention;

Fig. 2 is a top plan view of a valve and control means according to the invention;

Fig. 3 is an enlarged sectional view, taken substantially on line 3—3 of Fig. 2;

Fig. 4 is a similar sectional view taken substantially on line 4—4 of Fig. 3;

Fig. 5 is a fragmentary sectional view of a portion of Fig. 3, showing the valve and control means in an air exhaust position;

Fig. 6 is a fragmentary sectional view of the valve and control means actuating shaft in a momentarily displaced position;

Figure 7:
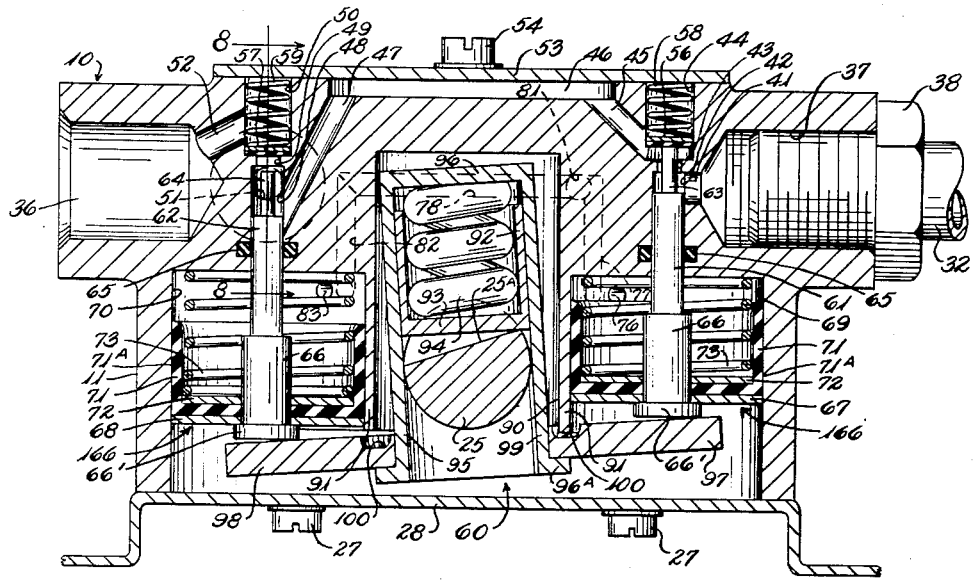
Figure 8:
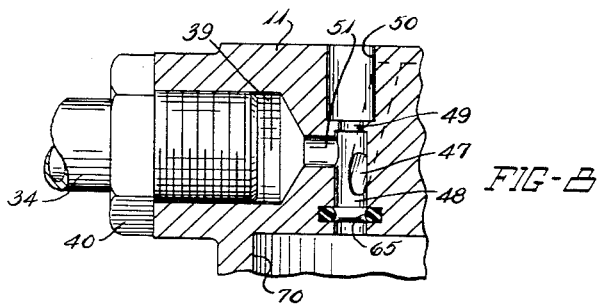

Fig. 7 is a further enlarged sectional view of the parts shown in Figs. 3 and 5, showing the valve and control means in an air supply position; and Fig. 8 is a fragmentary sectional view, taken substantially on line 8—8 of Fig. 7, certain elements being omitted for clarity of illustration, the view being rotated approximately 45°.

In the present invention a ride control valve means, indicated generally by the numeral 10, includes a housing 11, generally rectangular in cross section, which carries a damping means, and an air supply and exhaust control means. The housing 11 is located remotely and laterally of a conventional air spring bellows 12, of multi-ply rubber and cord construction and having one or more convolutions 13. The upper end of the air spring is hermetically fastened by a suitable clamp ring 14 to the underside of a horizontal transverse member 15 constituting a portion of the vehicle frame. The member 15 is securely affixed at either end to longitudinal frame members 16. The lower end of the air spring 12 is also hermetically fastened by a similar clamp ring 14 to the upperside of a bracket 17 on the axle housing 18 of the vehicle road gear. One mode of interposing an air spring between a vehicle frame and road gear has been shown and described. It will be understood, however, that the principles of the invention are applicable to air springs interposed in other ways between the frame and road gear. Also, only one air spring has been shown in connection with this invention, but it will be understood that the invention may be utilized with as many air springs as are required on a vehicle.

A stub flange 20 which may be located atop the vehicle differential housing 21, has a bolt 22 therethrough, which bolt extends through an elongated longitudinal slot 23 formed in the lower end of a control valve actuating rod 24, so that rod 24 is slidably mounted on bolt 22. The upper end of the actuating rod is fixed to one end of a control valve actuating shaft 25 and secured thereon by a nut 26, said shaft being mounted for rotation in housing 11 in a manner to be described. The housing 11 preferably is located above and to the rear of the horizontal plane of the axle, and is fastened by bolts 27 to a base bracket 28. The bracket 28 is fastened by bolts 29 to a frame member 30 extending transversely of and secured to the longitudinal frame members 16.

Air, from a source under pressure (not shown), is supplied to the control device 10 by suitable piping 32 having a conventional check valve (not shown) therein so that air cannot back out. The control device is connected by suitable piping 34 to an air spring fitting 33, which extends through the frame member 15 into the interior of the air spring. The piping 34 is the conduit for supplying air to and exhausting air from the air spring 12, through the control device 10, as referred to later.

Referring to Figs. 7 and 8, at one end of the housing 11 is an air exhaust port 36 which vents from within the housing to the atmosphere. At the opposite end of the housing is an air supply port 37 into which a fitting 38, attached to the piping 32, is tightly secured. On one side of the housing 11, adjacent the exhaust port 36 and communicating therewith interiorly of the housing, as described later, is a two-way port 39 into which a fitting 40, attached to the piping 34, is tightly secured.

The air supply port 37 opens through a short lateral passage 41 into a vertical bore 42, which has a reduced area or orifice 43 communicating with an upper enlarged chamber 44. The chamber 44 communicates through an upwardly extending diagonal passage 45 with a longitudinal passage 46 extending across the upper portion of the housing 11. The passage 46 communicates through a downwardly extending diagonal passage 47 with a second vertical bore 48, similar to bore 42. Bore 48 has a reduced area or orifice 49, similar to area 43, which communicates with an upper enlarged chamber 50, similar to chamber 44. Below the area 49, a short lateral passage 51 (Fig. 8) connects the port 39 with bore 48. The chamber 50 communicates with the air exhaust port 36 through a downwardly extending diagonal passage 52. The upper ends of the chambers 44 and 50, and the passage 46, are closed by a plate 53 extending longitudinally of the housing and tightly secured thereto by bolts 54.

Elements 36—53, just described define the paths interiorly of the valve housing 11, through which air passes from the supply port 37 to the two-way port 39, and from the latter port to the exhaust port 36.

The passage of air interiorly of the valve housing 11 is controlled by valves 56 and 57, in the form of flat, reinforced, air impermeable discs seated within chambers 44 and 50, respectively, against the upper ends of orifices 43 and 49, and backed by valve springs 58 and 59 seated at their upper end against the plate 53. In the embodiment of the invention shown, the strength of these valve springs is always greater than the pressure of the air in the piping 32 and 34, so that the valves are always tending to close the orifices 43 and 49, preventing passage of air past the valves into the chambers 44 and 50.

Obviously, the exhaust and supply ports 36 and 37 could be reversed, in which case the valve springs 58 and 59 need not be of a strength greater than the pressure of the air in the piping 32 and 34 because the air under pressure will be tending to close the valves 56 and 57 rather than open them.

Referring to Fig. 7, the valve actuating and damping means, indicated generally by the numeral 60, includes piston rods 61 and 62, vertically movable within bores 42 and 48, respectively. Each piston rod has a reduced upper end portion, 63 and 64, adapted to move through orifices 43 and 49, respectively, so as to lift valves 56 and 57 from their normal seats at the lower end of chambers 44 and 50. Each bore, 42 and 48, is fitted with an O-ring seal 65 which limits passage of air downward along the piston rods, 61 and 62, and passage of hydraulic fluid upward along the piston rod, as described later.

Each piston rod has an enlarged lower end portion 66 that terminates in a further enlarged head 66'. Movement of these piston rods upwardly to actuate valves 56 and 57, is controlled by the position of the pistons, indicated in their entirety by the numeral 166, one of which is secured to the lower end of each rod. The pistons 166 are movable respectively in cylinder bores 69 and 70 formed in housing 11 below bores 42 and 48, respectively.

Each piston 166 comprises an end plate, 67 and 68, respectively, bearing against head 66', a resilient cup 71, resistant to hydraulic fluid and having side portions 71A engaging the sides of bores 69 and 70 to form an oil tight seal, and an inner plate 72 engaging the bottom of each cup. A compression spring 73 is arranged between each plate 72 and the top of each cylinder bore, respectively. Springs 73 hold the cups and piston plates in proper position with respect to piston heads 66'.

Each bore, 69 and 70, is filled completely with a suitable liquid such as hydraulic brake fluid above the piston plates 72. As described later, movement of one piston in one direction, up or down, produces a movement of the other piston in the opposite direction, with consequent movement of the piston rods. This result is obtained by providing a conduit or passageway through the valve housing 11 connecting bores 69 and 70 a slight distance below the top of each bore. Referring to Figs. 4 and 7, a short lateral passage 76 connects the bore 69 with a vertical passage 77, which in turn communicates with a transverse passage 78. The latter passage communicates with a vertical passage 82, which in turn communicates with a short passage 83 opening into bore 70. To regulate the flow of fluid through the passage 78, thereby controlling the rate at which fluid can be displaced from within bore 69 to within bore 70, or vice versa as the case may be, an adjustable needle valve 80 is inserted into a short passage 81 extending horizontally through the wall of the valve housing 11, into the passage 78. Movement of the needle valve 80 into the passage 78 will provide reduction in the rate at which a given quantity of fluid will move therethrough. Conversely, movement of the needle valve 80 out of the passage 78 will permit an increase in the rate of fluid flow.

Movement of the piston rods and pistons is effected by components of the means 60 which are actuated by the shaft 25. As more clearly shown in Figs. 2 and 4, the actuating shaft 25 extends through the medial portion of the valve housing. The end of the shaft fastened to the actuating rod 24 is journaled in a boss 85 on the side of the housing 11 opposite of the port 39. The other end of the shaft is journaled in a similar boss 86 on the other side of the housing. Both ends of the shaft 25 are round so as to rotate freely in its bearings. However, within the valve housing 11, the shaft is generally semi-circular in section, having a flattened surface 25A.

The actuating shaft 25 extends transversely through the lower portion of a vertical cylindrical bore 90 located between the damping piston bores 69 and 70. The height of the bore 90 is greater than that of the bores 69 and 70, and shares with them common wall sections 91 at its lower end.

Within the bore 90 is a plunger cup 92, having a closed lower end 93 which contacts the shaft 25 and is normally (as shown in Fig. 3) resting upon the flattened surface 25A. Placed within the cup 92 so as to contact the inner surface of the cup end 93, is a coiled, compression shaft follower spring 94, the upper end of which extends above the open end of the plunger cup, into engagement with the closed upper end 96 of a shaft follower cup 95.

As shown, the cup 92 and follower spring 94 are movably contained within the shaft follower cup 95. The open lower end of the follower cup 95 is provided with a flange 96a, to which is rigidly secured, on opposite sides thereof, a pair of piston actuating bars, 97 and 98. The follower cup 95 and the actuating bars 97 and 98 define an oscillating member which, when actuated by the rotating shaft 25, selectively contact the piston heads 66'. Adjacent the vertical sides 99 of the follower cup 95, each of the actuating bars 97 and 98 is provided with a recessed groove 100, so that rocking movement of the actuating bars is unhindered by the wall sections 91 of the valve housing.

The operation of the control device 10 is as follows:

Let us assume that the normal static load on the vehicle suspension requires the air springs to be inflated to a pressure of about 50 p.s.i., in which condition the valves 56 and 57 are in the position shown in Fig. 3, that is, seated atop the restricted orifices 43 and 49 and preventing air from passing through the chambers 44 and 50. This normal position of the valves is brought about because, in the preferred embodiment shown, the valve springs 58 and 59 are so engineered as to always be tending to seat the valves and close the orifices.

Now then, assume that the static load is increased, for example, by adding merchandise or passengers to the vehicle. As the load is increased, the upper frame members 15 and 16 move downwardly toward the axle housing 18, causing the air spring 12 to contract. During this downward movement of the upper frame members, the frame member 30 and the control device 10 also move downwardly. Such downward movement of the control device 10, causes the actuating shaft 25 to be turned by the actuating rod 24, the lower end of which is slidably attached to the differential housing, to permit sliding movement of the rod as the device 10 moves downwardly. That is, as the distance between the member 15 and the axle housing 18 decreases, the rod 24 will cause the shaft 25 to be rotated within the valve housing 11.

As viewed in Fig. 1, an increased load would cause the shaft 25 to rotate in a counter-clockwise direction to supply air under pressure into the air spring 12. Referring specifically to Fig. 7, as the shaft 25 is rotated counter-clockwise on its axis, transverse of the bore 90, the plunger cup 92 will be displaced upwardly within the follower cup 95, compressing further the follower spring 94. As the spring 94 is compressed, energy stored therein becomes directed substantially equally between the lower end 93 of the plunger and the upper end 96 of the follower. The plunger end is fixed by the shaft and cannot be displaced downwardly though it will immediately do so in the event the shaft 25 is rotated back even a small degree in a clockwise direction. However, within certain limits, the follower cup 95 can be displaced laterally within the bore 90 away from the shaft 25. Therefore, as the spring 94 is compressed, the follower cup 95 will be caused to rotate on the same axis as that of the shaft 25 and be displaced upwardly to assume the position shown in Fig. 7. That is, the follower cup will turn counter-clockwise until the left hand corner of the upper end 96 contacts the side wall of the bore 90 and can turn no farther. As the follower cup is rotated, the actuating bar 97 will contact the plunger head 66' and move the right hand piston upward within the bore 69. As described elsewhere, the bore 69 is liquid filled and in communication with the opposite bore 70. As the bar 97 moves upward, the opposite bar 98 is moved downward, permitting the left hand piston to also move downward, as fluid is forced from the area above the piston in bore 69 to the area above the piston in bore 70. The speed of upward movement of the right hand piston is determined and controlled by the position of the needle valve 80 in the transverse passage 78. The energy or force for such movement is provided by the follower spring 94 acting upon the actuating bar 97, through the follower cup 95.

As the right hand piston moves upwardly, so also does the piston rod 61 and its upper end 63, causing the valve 56 to be raised from its seat atop the orifice 43 permitting additional air to pass into the chamber 44, through the various passages to the port 39, and then to the air spring 12. This additional air must be under a greater pressure than the air already in the spring 12, and will extend the air spring to its initial position.

As the air spring extends, the upper frame members 15 and 16 move upwardly from the axle housing 18, causing the actuating shaft 25 to be turned by the actuating rod 24 in a clockwise direction as viewed in Fig. 7. As the shaft 25 begins to assume the normal position shown in Fig. 3, the follower spring 94 will urge the plunger cup 92 downward, which action permits the follower cup 95 to begin to assume its normal position. The force which has been directing the actuating bar 97 upward, and bar 98 downward is reversed in direction, the flow of hydraulic fluid thus being reversed so that the fluid will move from the area above the left hand piston to the area above the right hand piston. This lowers piston rod 61 and allows spring 58 to close the valve 56, stopping the flow of additional air and maintaining the original position of the air spring. The spring 73 within the bore 69 assists in returning the right hand piston to its normal position as equilibrium is being reached, thus adding to the stability of the device.

If the static load on the vehicle suspension is decreased, the frame members 15 and 16 move upwardly away from the axle housing 18, causing the air spring 12 to extend. During this upward movement of the upper frame members, the frame member 30 and the control device 10 also move upwardly. Such upward movement of the control device 10 causes the actuating shaft 25 to be rotated by the actuating rod 24, in the clockwise direction as viewed in Fig. 5, said rod sliding with respect to the bolt 23 as the device 10 moves upwardly.

Referring specifically to Fig. 5, as the shaft 25 is rotated clockwise on its axis, transverse of the bore 90, the plunger cup 92 will be displaced upwardly within the follower cup 95, compressing further the follower spring 94. The ensuing action is identical but opposite to that described in connection with Fig. 7. That is, as the follower cup 95 is turned on the same axis as that of the shaft 25 and displaced upwardly to assume the position shown in Fig. 5, the actuating bar 98 contacts the piston head 66' and moves the left hand piston upward within the bore 70. This displaces fluid from above the left hand piston to above the right hand piston. As the left hand piston moves upwardly, so also does the piston rod 62 and its upper end 63, causing the valve 57 to be raised from its seat atop the orifice 49, permitting air to exhaust from the air spring 12, through the two-way port 39, the lateral passage 51, the bore 48, the chamber 50, the passage 52 and the exhaust port 36, to the atmosphere. The exhaust of air from within the spring 12 will contract the air spring to its initial position.

As the air spring contracts, the upper frame members 15 and 16 move downwardly toward the axle housing 18 causing the actuating shaft to be rotated by the actuating rod 24 in a counter-clockwise direction as viewed in Fig. 5. The ensuing action at this point is also identical but opposite to that described in connection with Fig. 7. That is, the force of the spring 94 urges the plunger cup 92 downward and the follower cup 95 begins to assume its normal position. The force on the actuating bar 98 is reversed in direction and the fluid will begin to flow from the area above the right hand piston to the area above the left hand piston. This lowers piston rod 62 and allows spring 59 to close the valve 57, stopping the exhaust of air and maintaining the original position of the air spring. The spring 73, within the bore 70 assists in returning the piston 68 to its normal position.

When a vehicle equipped with a suspension system according to the invention is driven over rough roads with no change in the static loading, the vehicle wheels will move up and down over bumps and into holes in the road. This causes the actuating shaft to be quickly rotated in either direction as the case may be. However, as shown in Fig. 6, a quick rotation of the shaft 25 will not cause the various components of the control device 10 to react to supply or exhaust air because of the damping or time delay effect of the pistons 166 upon upward movement of the piston rods 61 and 62. Thus, the admission of additional air to or exhaust of air from the air spring 12 will not occur until a force is maintained in one direction for a predetermined period of time which can be controlled by the needle valve 80 in the fluid transfer passage 78. After the several springs in the device are balanced, it will be found desirable to choose a needle valve 80 which will provide a time lag of about 7 seconds before the follower cup 95 will move from the normal or middle position shown in Fig. 3, to that shown in either Figs. 5 or 7. However, the time delay may be selected any place within the preferred range of from 1 to 20 seconds.

A shut off valve (not shown) can be provided in the air spring line 34 so that an operator can shut off the line when raising the vehicle by a bumper jack to remove a tire.

While a preferred embodiment of the invention has been shown it will be apparent that changes and modifications, other than those specifically noted herein, could be made without departing from the basic principles of the invention. Therefore, the annexed claims are intended to embody therein changes of such nature.

What is claimed is:

1. Control means adapted for regulation of the supply and exhaust of air to and from an expansible bellows for a vehicle suspension system to maintain a predetermined height between the road gear and frame of the vehicle, comprising, a housing, said housing having an air supply port, an air exhaust port and a two-way port, with passageways connecting said supply port with said two-way port and said exhaust port with said two-way port, valves within said housing closing said passageways, parallel pistons movable upwardly within the housing to open said valves, that portion of the housing between said pistons having walls defining a bore between and parallel with said pistons, a shaft extending transversely of said bore adapted for rotation by relative movement between the road gear and frame of the vehicle, shaft follower means within said bore responsive to movement of said shaft, and actuating means for said pistons affixed to said follower means below said bore and extending laterally thereof beneath said pistons, said actuating means selectively actuating one of said pistons to open one of said valves.

2. Control means adapted for regulation of the supply and exhaust of air to and from an expansible bellows for a vehicle suspension system to maintain a predetermined height between the road gear and frame of the vehicle, comprising, a housing, said housing having an air supply port, an air exhaust port and a two-way port, with passageways connecting said supply port with said two-way port and said exhaust port with said two-way port, valves within said housing closing said passageways, parallel pistons movable upwardly within the housing to open said valves, that portion of the housing between said pistons having walls defining a bore between and parallel with said pistons, a shaft extending transversely of said bore adapted for rotation by relative movement between the road gear and frame of the vehicle, a plunger cup slidable in said bore, a compressed follower spring within said plunger cup urging the latter into contact with said shaft, a follower cup surrounding said plunger cup and follower spring, and being urged by said spring in the opposite direction from said follower cup, and a pair of actuating bars affixed to said follower cup below said bore and extending laterally thereof beneath said pistons, said actuating bar selectively actuating one of said pistons to open one of said valves.

3. Control means adapted for regulation of the supply and exhaust of air to and from an expansible bellows for a vehicle suspension system to maintain a predetermined height between the road gear and frame of said vehicle, comprising, a housing, valves in said housing controlling said supply and exhaust of air, a pair of parallel pistons movable upwardly within the housing to actuate said valves, a shaft between said pistons adapted for rotation by relative movement between the road gear and frame of the vehicle, oscillatable piston operating members operatively connected to said shaft to actuate said valves when said shaft is rotated, a passageway in said housing connecting the areas above each of said pistons, and means including a liquid completely filling said passageway and areas above said pistons operable when one of said pistons is moved upwardly to move the other of said pistons downwardly.

4. Control means adapted for regulation of the supply and exhaust of air to and from an expansible bellows for a vehicle suspension system to maintain a predetermined height between the road gear and frame of said vehicle, comprising, a housing, valves in said housing controlling said supply and exhaust of air, parallel pistons movable upwardly within the housing to actuate said valves, a shaft between said pistons adapted for rotation by relative movement between the road gear and frame of the vehicle, said shaft having a flattened upper surface, an inner cup above said flattened shaft surface, an outer cup telescopically enclosing said inner cup and shaft, a spring interposed between said cups urging said inner cup against said flattened shaft surface, and actuating bars affixed to said outer cup and extending laterally thereof to actuate said pistons.

5. In combination with a control device for regulation of the supply and exhaust of air to and from an expansible bellows for a vehicle suspension system to maintain a predetermined height between the road gear and frame of said vehicle, said device including a housing and valves within said housing controlling said supply and exhaust of air, a shaft extending transversely of said housing and adapted for rotation by relative movement between the road gear and frame of the vehicle, said shaft having a flattened surface, an inner cup adapted to seat on said flattened shaft surface, an outer cup telescopically enclosing said inner cup and shaft, a spring interposed between said cups urging said inner cup against said flattened shaft surface, and valve actuating means connected to said outer cup.

References Cited in the file of this patent

UNITED STATES PATENTS

| 1,990,938 | Gerry | Feb. 12, 1935 |
| 2,194,080 | Best | Mar. 19, 1940 |
| 2,567,703 | Grandgirard | Sept. 11, 1951 |
| 2,646,072 | Sebald | July 21, 1953 |
| 2,670,201 | Rossman | Feb. 23, 1954 |
| 2,774,376 | Young | Dec. 18, 1956 |

FOREIGN PATENTS

| 287,918 | Germany | of 1915 |